(No Model.)
N. P. MERCHANT.
STUMP PULLER.
No. 264,552. Patented Sept. 19, 1882.
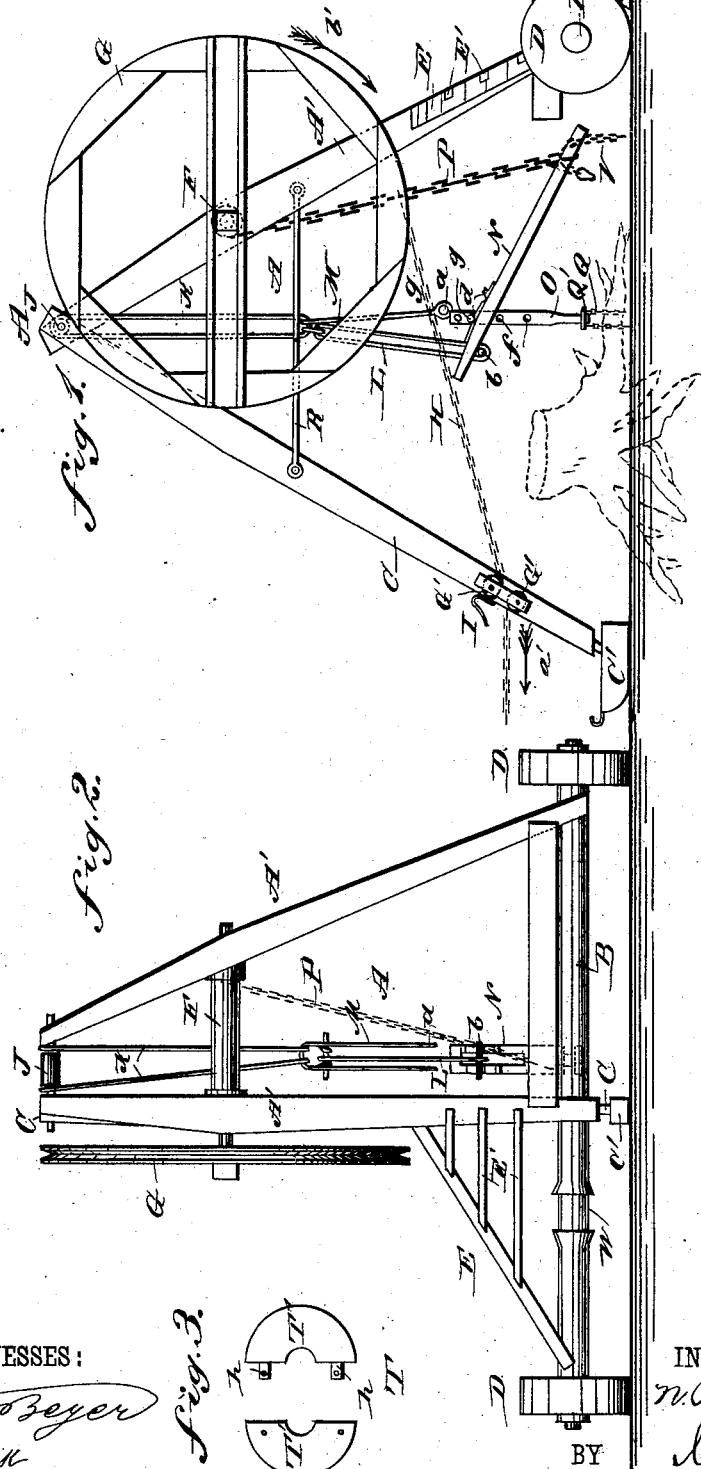
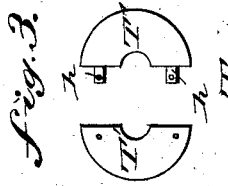
WITNESSES:
INVENTOR:
N. P. Merchant
BY
ATTORNEYS.

UNITED STATES PATENT OFFICE.

NEWTON P. MERCHANT, OF BLAINE, MICHIGAN.

STUMP-PULLER.

SPECIFICATION forming part of Letters Patent No. 264,552, dated September 19, 1882.

Application filed August 7, 1882. (No model.)

*To all whom it may concern:*

Be it known that I, NEWTON P. MERCHANT, of Blaine, in the county of St. Clair and State of Michigan, have invented a new and Improved Stump-Puller, of which the following is a full, clear, and exact description.

The object of my invention is to facilitate the pulling of stumps of all sizes.

The invention consists in a frame carrying wheels, shafts, and levers for pulling stumps, which frame is mounted on an axle and on a runner.

The invention further consists in the combination, with the wheel and shaft, of a lever to which an adjustable bar is held, to which bar the chain for pulling the stump is attached, and in a clevis having eyes at the lower ends, in which clevis the above-mentioned bar is held while adjusting the wheel and the chain for turning the same for again lifting the stump.

The invention also consists in a detachable wheel, and in certain parts of construction and combination of the same, as will be fully explained and set forth hereinafter.

Reference is to be had to the accompanying drawings, forming a part of this specification, in which similar letters of reference indicate corresponding parts in all the figures.

Figure 1 is a rear end elevation of my improved stump-puller. Fig. 2 is a longitudinal elevation of the same. Fig. 3 is a detail view of a detachable wheel.

A frame, A, is formed of two inclined posts, A', resting on an axle, B, and of a front inclined strut or post, C, resting on a sled or runner, C'. The axle B is provided with wheels D at the ends, and one of the struts or posts, A', is braced and stiffened from the axle by means of braces E and rods E', connecting the brace with the post A'. A horizontal shaft, F, is journaled in the inclined posts A', and on one end of this shaft a grooved wheel, G, is mounted, to which wheel G a chain, H, is attached, which passes between two anti-friction guide-pulleys, H', on the post or strut C, which chain H is adapted to pass within the groove of the wheel G. A hook, I, is provided on the front strut or post, C, in which hook the chain H can be secured when the stump hangs in the frame. A shaft, J, unites the upper ends of the struts or posts A', and from this shaft J link-pieces K are suspended, from the lower ends of which a link-piece, L, and a clevis, M, are suspended, the clevis being provided with eyes or loops $a$ at the lower ends. A longitudinally-slotted lever, N, rests on a cross-pin, $b$, in the bottom of the link L, and is provided on its upper surface with one or more lugs or projections, $d$. A bar, O, passing vertically through the slot of the lever N, is provided with a series of apertures, $f$, through one of which a pin, $g$, is passed, which rests upon the lever N. A chain, P, attached to the shaft F, is secured to the long end of the lever N. A chain, Q, which is passed around the roots of the stump, is attached to the lower end of the bar O. The struts A' and C are connected by braces and tension-rods R, which stiffen and strengthen the frame. A wedge, S, is placed behind the wheels D to hold the machine in place. A wheel, T, made of two sections, T T', is adapted to be mounted on the axle B at the journal W. One section, T', is provided with tenons $h\ h$, fitting mortises on the opposite section, T', and the sections are locked together by passing bolts transversely through the tenons after they have been inserted in the mortises. This wheel T is for the purpose of enabling the machine to be moved from place to place along common roads, the outer wheel, D, being removed.

The operation is as follows: A horse or team of horses are coupled to the chain H, part of which is contained in the groove of the wheel G. The chain Q is passed around one of the roots of the stump and attached to the bar O. The lower end of the chain P is attached to the end of the lever N, and by drawing or pulling the chain H in the direction of the arrow $a'$ the wheel G and the shaft F will be rotated in the direction of the arrow $b'$, and the chain P will be wound on the shaft F, whereby the long end of the lever N and the bar O, resting on this lever N, will be raised, and the root of the stump will be pulled out of the ground. When the bar O has been raised to such an extent that it passes between the shanks of the clevis M a pin is passed through the eyes $a$ at the lower end of the clevis and one of the apertures $f$ of the bar O to hold the bar O in place. This chain H is wound on the wheel G, and then the bar O is released from the clevis and is again raised by pulling the chain H in the direction of the arrow $a'$ and rotating the wheel G in the direction of the arrow $b'$. In this manner the stump is raised gradually and slowly. By means of the above-described device very great power is obtained, and the largest stumps can be raised easily. If smaller stumps, or stumps which are not embedded deeply in the ground, are to be raised, the chain P, which is provided at its lower end with a hook or grab, V, is attached to the stump, and the stump is raised by winding the drum P on the shaft F by means of the chain H and the wheel G in the manner described.

This machine can also be used for transporting stumps short distances.

To allow for the proper adjustment of the lever N and the draft-chains the lower end of the rod O is provided with a swiveled connection with the chain Q.

Having thus described my invention, I claim as new and desire to secure by Letters Patent—

1. In a stump-puller, the combination, with the frame A, of the shaft F, the grooved wheel G, the chain H, attached to parts within this groove, the anti-friction pulleys G', and the chain P, substantially as herein shown and described, and for the purpose set forth.

2. In a stump-puller, the combination, with the frame A, of the axle B, the wheels D, the runner C', the shaft F, the grooved wheel G, and the chain P, substantially as herein shown and described, and for the purpose set forth.

3. In a stump-puller, the combination, with the frame A, of the shaft F, the grooved wheel G, the chain H, the anti-friction rollers G', the hook I, and the chain P, substantially as herein shown and described, and for the purpose set forth.

4. In a stump-puller, the combination, with the frame A, of the shaft J, the link-pieces K, suspended from the shaft J, the link-piece L, the clevis M, suspended from the link-piece K, the lever N, the bar O, the shaft F, and the chain P, substantially as herein shown and described, and for the purpose set forth.

5. In a stump-puller, the combination, with the frame A, of the shaft J, the link-piece K, suspended from the shaft J, the link-piece L, the clevis M, provided with eyes $a$ at the lower end, the lever N, the bar O, provided with apertures $f$, the chain Q, the chain P, and the shaft F, substantially as herein shown and described, and for the purpose set forth.

6. In a stump-puller, the combination, with the frame A and the stump-pulling devices, of the shaft B, provided with an intermediate journal, W, the end wheels, D, a detachable wheel, T, which can be mounted on the shaft at the journal W, and of the runner C', substantially as herein shown and described, and for the purpose set forth.

7. In a stump-puller, the combination, with the frame A and the stump-pulling devices, of the shaft B, provided with an intermediate journal, W, the end wheels, D, a detachable wheel, T, formed of two sections, T', of which one section is provided with tenons, which fit into mortises in the opposite section T', substantially as herein shown and described, and for the purpose set forth.

NEWTON PRESTON MERCHANT.

Witnesses:
GEO. P. VOORHEIS,
THOS. H. ADAMS.